United States Patent [19]
Buchter

[11] Patent Number: 5,833,482
[45] Date of Patent: Nov. 10, 1998

[54] PIVOTABLE ELECTRICAL CONNECTOR

[75] Inventor: Randolph Lee Buchter, Harrisburg, Pa.

[73] Assignee: The Whitaker Corporation, Wilmington, Del.

[21] Appl. No.: 708,435

[22] Filed: Sep. 5, 1996

Related U.S. Application Data

[60] Provisional application No. 60/003,474 Sep. 8, 1995 and provisional application No. 60/020,583, filed Jun. 26, 1996.

[51] Int. Cl.$^6$ .................................................. H01R 13/28
[52] U.S. Cl. ........................... 439/288; 439/31; 439/191; 439/376
[58] Field of Search ................................ 439/31, 34, 138, 439/192, 191, 194, 205, 206, 288, 376, 660

[56] References Cited

U.S. PATENT DOCUMENTS

| | | |
|---|---|---|
| 534,732 | 2/1895 | Titcomb . |
| 1,102,300 | 7/1914 | Shailor . |
| 1,123,074 | 12/1914 | Bliss . |
| 1,225,127 | 5/1917 | Heath . |
| 1,689,824 | 10/1928 | Goelz . |
| 2,288,192 | 6/1942 | Hegenauer . |
| 2,522,672 | 9/1950 | Graham . |
| 2,626,168 | 1/1953 | Macy . |
| 2,629,763 | 2/1953 | Macy . |
| 2,636,071 | 4/1953 | Matthysse . |
| 2,738,477 | 3/1956 | Matthyssee . |
| 3,545,917 | 12/1970 | Engle ........................................ 303/15 |
| 3,706,956 | 12/1972 | Epifani et al. . |
| 3,812,444 | 5/1974 | Reno . |
| 3,895,850 | 7/1975 | Engle et al. . |
| 5,385,480 | 1/1995 | Hoffman ................................. 439/310 |
| 5,395,248 | 3/1995 | Kinoshita et al. ........................ 439/31 |

FOREIGN PATENT DOCUMENTS

| | | |
|---|---|---|
| 2250660 | 10/1974 | France . |
| 466454 | 10/1928 | Germany . |
| 1156515 | 6/1969 | United Kingdom . |

OTHER PUBLICATIONS

"Air Brakes for Model Railroaders", Model Railroader, Nov. 1994, pp. 100–105.

Aar's Advanced Brake System Initiative "Putting E–P Brakes to the Test" by F.G. Carlson Senior Research Engineer, Association of American Railroads for Railway Age (Feb. 1995) pp. 31,32,34,36,38,39.

"Benefits Beckon Electro–Pneumatic", Progressive Railroading, Feb. 1995, pp. 60–62 and 64.

"EP Brake Integrated Connector System", Preliminary Data Sheet, Received Aug. 1995.

"Brake Connector Offers Air, Electric in One Unit", Progressive Railroading, Dec. 1995, p. 67.

Primary Examiner—Gary F. Paumen
Attorney, Agent, or Firm—Katherine A. Nelson

[57] ABSTRACT

A pivotable connector assembly includes first and second matable connectors (20, 20) adapted to be brought into mated engagement by rotating the connectors in a first angular direction about a center of pivoting, and adapted to be disengaged by rotating the connectors in an opposite second angular direction about the center of pivoting. Each connector (20) includes a housing (22) having at least one contact having an arcuate section mounted therein. One of the contacts (96) is rigidly mounted within its respective connector housing and the other of the contacts (60) is resiliently mounted within its respective connector housing such that upon mating of the first and second connectors (20, 20) the arcuate section of the resiliently mounted contact (60) is engaged by the arcuate section of the rigidly mounted contact (96) along an elongate mating path and laterally deflected therefrom under bias. The contacts (60, 96) are adapted to accommodate a wide range of arcuate distance during mating of the connectors and the resiliently mounted contact assures sufficient mating force between the arcuate sections of the mating contacts (60, 96).

18 Claims, 20 Drawing Sheets

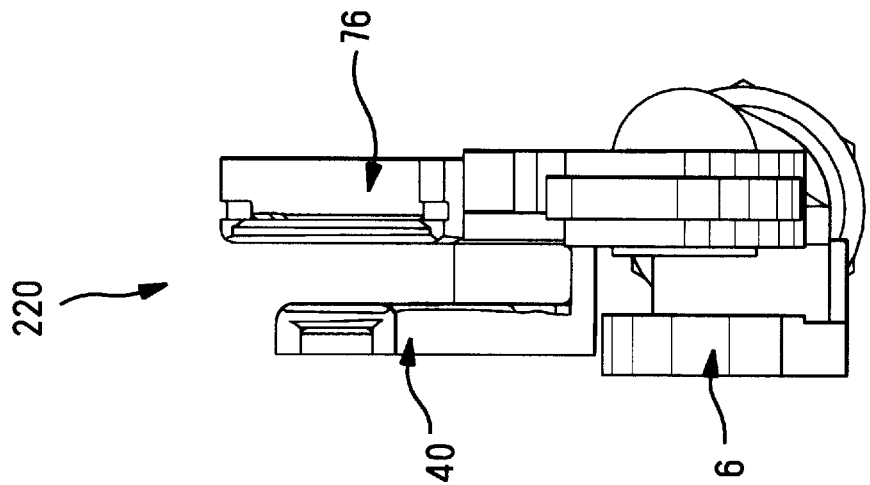
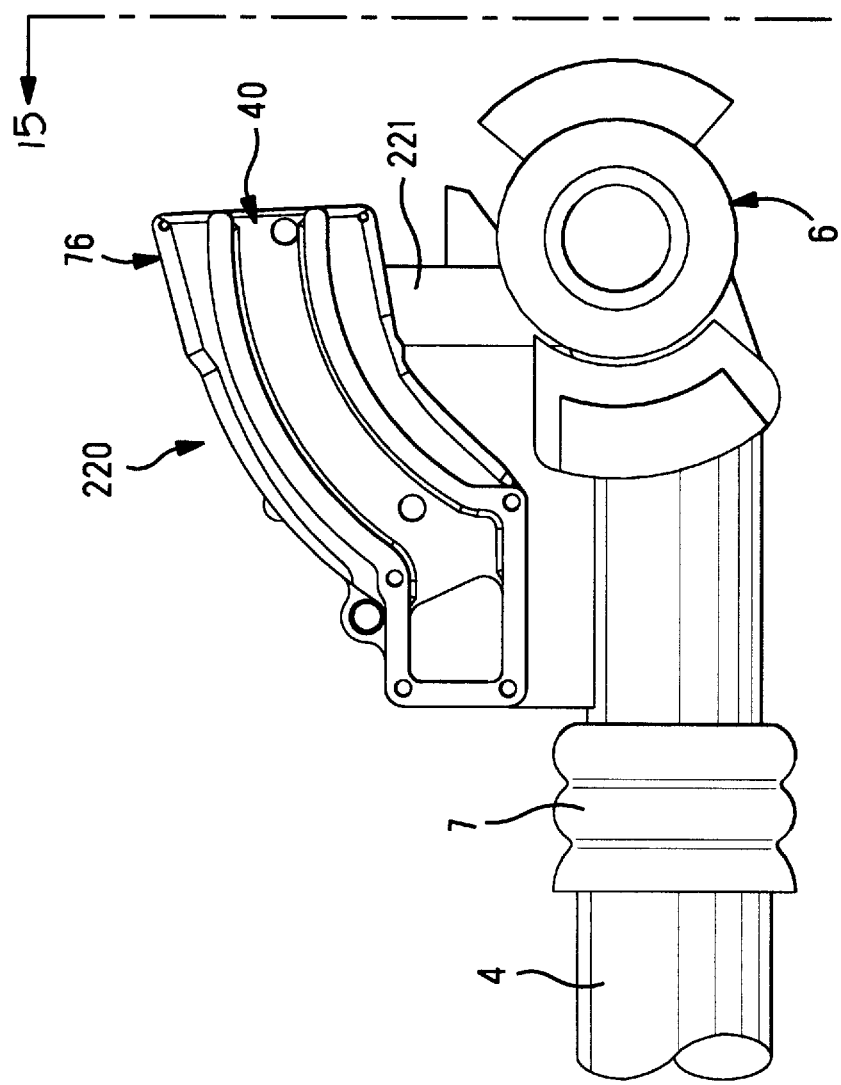

PIVOTABLE ELECTRICAL CONNECTOR

This application claims the benfit of U.S. Provisional Application Nos. 60/003,474, filed Sep. 8, 1995 and 60/020/583, filed Jun. 26, 1996.

FIELD OF THE INVENTION

The present invention is directed to a connector assembly in which contacts are brought into electrical engagement by rotating the connectors in an angular direction about a center of pivoting and more particularly to electrical connectors for electronically controlled pneumatic (EP) braking systems for trains.

BACKGROUND OF THE INVENTION

There has been increased interest in electronically controlled freight car brake systems for providing more uniform braking of freight cars in a train. The automatic air brake system has been a standard brake employed by the railroad industry for many years. This brake, while satisfactory, has certain disadvantages, primarily the slow response time to effect braking all of the cars of the train, an inability to effect repeated applications of the brakes, an inability to provide a graduated release of the brakes, and an inability to simultaneously operate the brakes on all cars. It is desirable, therefore, to have an electronically controlled pneumatic braking system that would simultaneously apply the brakes to all the cars of the train thereby decreasing both stopping time and stopping distance and also permitting a graduated application or a graduated release of the brakes.

U.S. Pat. Nos. 3,545,816 and 3,895,850 disclose electropneumatic train line connectors that employ a single train line control wire and use the gladhands or hose couplers between the brake pipes to interconnect the wires between cars. The return path for the circuitry in these prior art patents rely upon the metal rails, the wheels, the car bodies and the couplers. The return path further serves as a ground path.

With today's electronic technology, there are numerous electronic devices being used along the railroad tracks for operating switches, signals, crossing lights, crossing gates and the like. Using the metal rails, car bodies, couplers, and wheels as the return line for EP brakes is unsatisfactory because the rails are typically included as part of the electrical circuit used to operate the electronic devices. It is desirable, therefore, that the EP braking system be electrically isolated from the rails. It is further desirable that the connector and EP system be one that uses the present air brake cylinders and brake rigging.

SUMMARY OF THE INVENTION

The present invention provides a pivotal electrical assembly mountable to the existing pneumatic brake system. The connectors are matable simultaneously with the engagement of the gladhands to which they are mounted. The pivotal connector assembly includes first and second matable connectors, each connector having a housing and at least one contact disposed therein. The contacts are brought into electrical engagement by rotating the connectors in a first angular direction about a center of pivoting and are adapted to be disengaged by rotating the connectors in an opposite second angular direction about the center of pivoting. At least one of the contacts has an elongate arcuate section defining an elongate mating path. One of the contacts is rigidly mounted within its connector housing and the other of the contacts is resiliently mounted within its housing. Upon mating of the first and second connectors the contact surface of the resiliently mounted contact is engaged by the elongate arcuate section of the rigidly mounted contact along the elongate mating path and is laterally deflected therefrom under bias. The resiliently mounted contact assures that there is sufficient normal force between the mated contacts. The contacts are adapted to accommodate a wide range of arcuate distance during the mating of the first and second connectors.

In the preferred embodiment, the first and second connectors are hermaphroditic with each of the first and second connector housings including first and second connecting portions one being a plug and the other being a complementary receptacle. One of the connecting portions has a rigidly mounted arcuate contact therein and the other connecting portion has a resiliently mounted contact therein. For purposes of illustrating the invention, the rigidly mounted contact will be shown mounted in the receptacle and the resiliently mounted contact will be shown in the plug.

The EP braking system of the present invention includes a cable having at least two wires, one for the outgoing path and the other for the return path. Alternatively the cable may also be provided with a third wire and the plug and receptacle connectors each provided with an additional contact for purposes of grounding the system. Owing to the hermaphroditic nature of the connector assembly, the third wire would be attached to and common the additional contact of both the plug and receptacle connectors.

In the preferred embodiment the housing of the connectors is cast from ductile or malleable iron, the same material as the gladhand. The contacts within the housing are mounted to dielectric bodies within the housing. The rigidly mounted contact is further supported along its entire length by a dielectric body portion. To prevent debris from entering an unused connector, such as the connector attached to the gladhand in the last car of a train the receptacle or female connector is provided with spring loaded doors and a rubber seal. The rubber seal also prevents moisture from entering the mated connectors.

Embodiments of the invention will now be described by way of example with reference to the accompanying drawings.

BRIEF DESCRIPTION OF THE DRAWINGS

FIG. 11 is a partially sectional view similar to that of FIG. 7 illustrating the two connectors as they are brought into mating engagement.

FIG. 12 is a partially sectioned view as the contacts are beginning to engage and the gladhand is partially rotated.

FIG. 13 shows the contacts in full engagement as the gladhands are fully engaged.

FIG. 14 is a perspective side view of a further embodiment of the invention wherein the gladhand and connector housing are integrally formed.

FIG. 15 is a perspective frontal view of the embodiment taken in the direction indicated by the line 15—15 in FIG. 14.

DETAILED DESCRIPTION OF THE PREFERRED EMBODIMENTS

Figure 1:
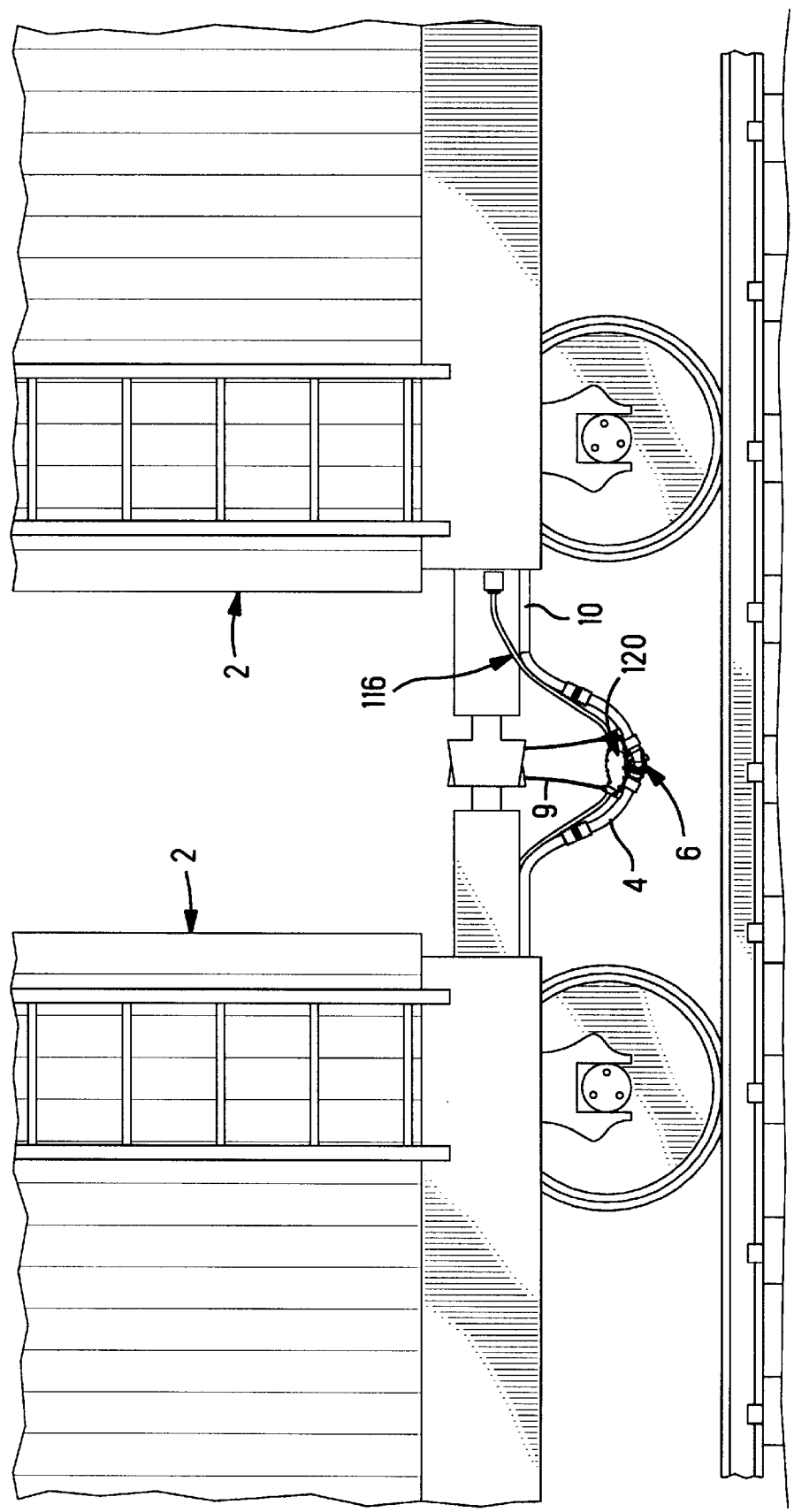
FIG. 1 is a diagrammatic and elevated view of two freight cars having one embodiment of the invention mounted to the gladhands.
Figure 2:
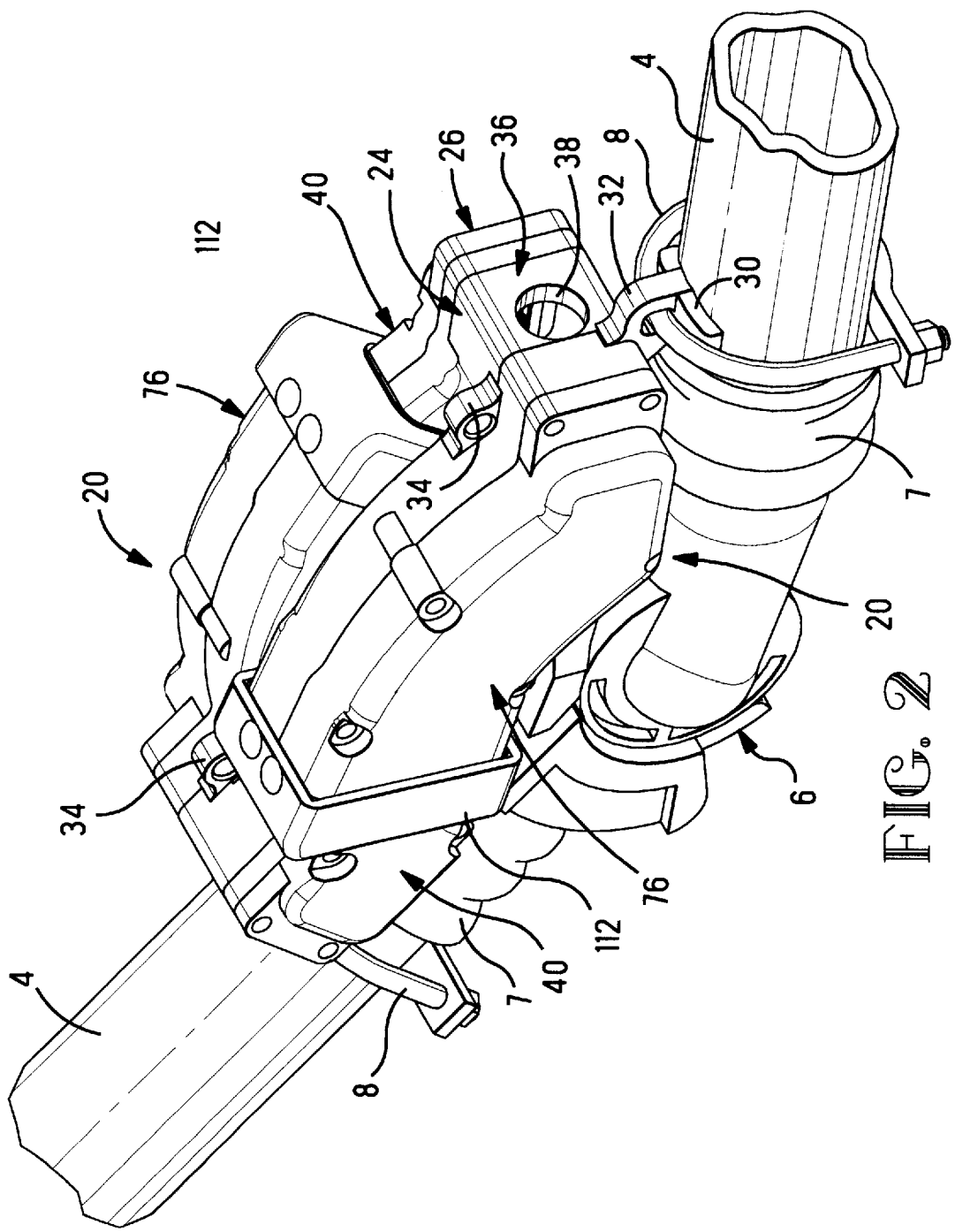
FIG. 2 is a perspective view of another embodiment of the present invention clamped to the gladhands with the cable and cable strain relief being omitted.
Figure 3:
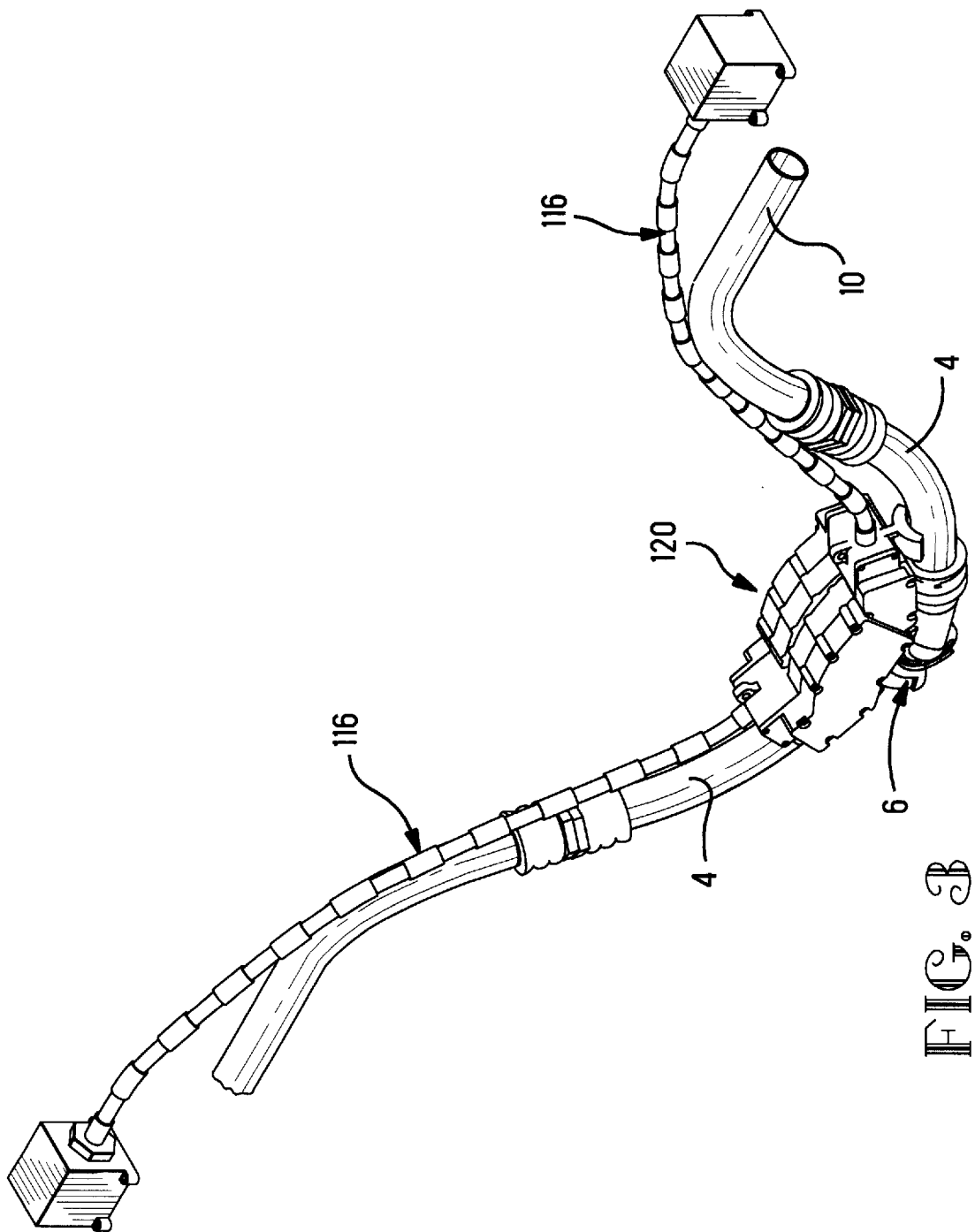
FIG. 3 is a perspective fragmentary view of the electrical cable and the junction boxes associated therewith, the air pipe, air hose, gladhands and connector assembly attached to the freight cars shown in FIG. 1.
Figure 4:
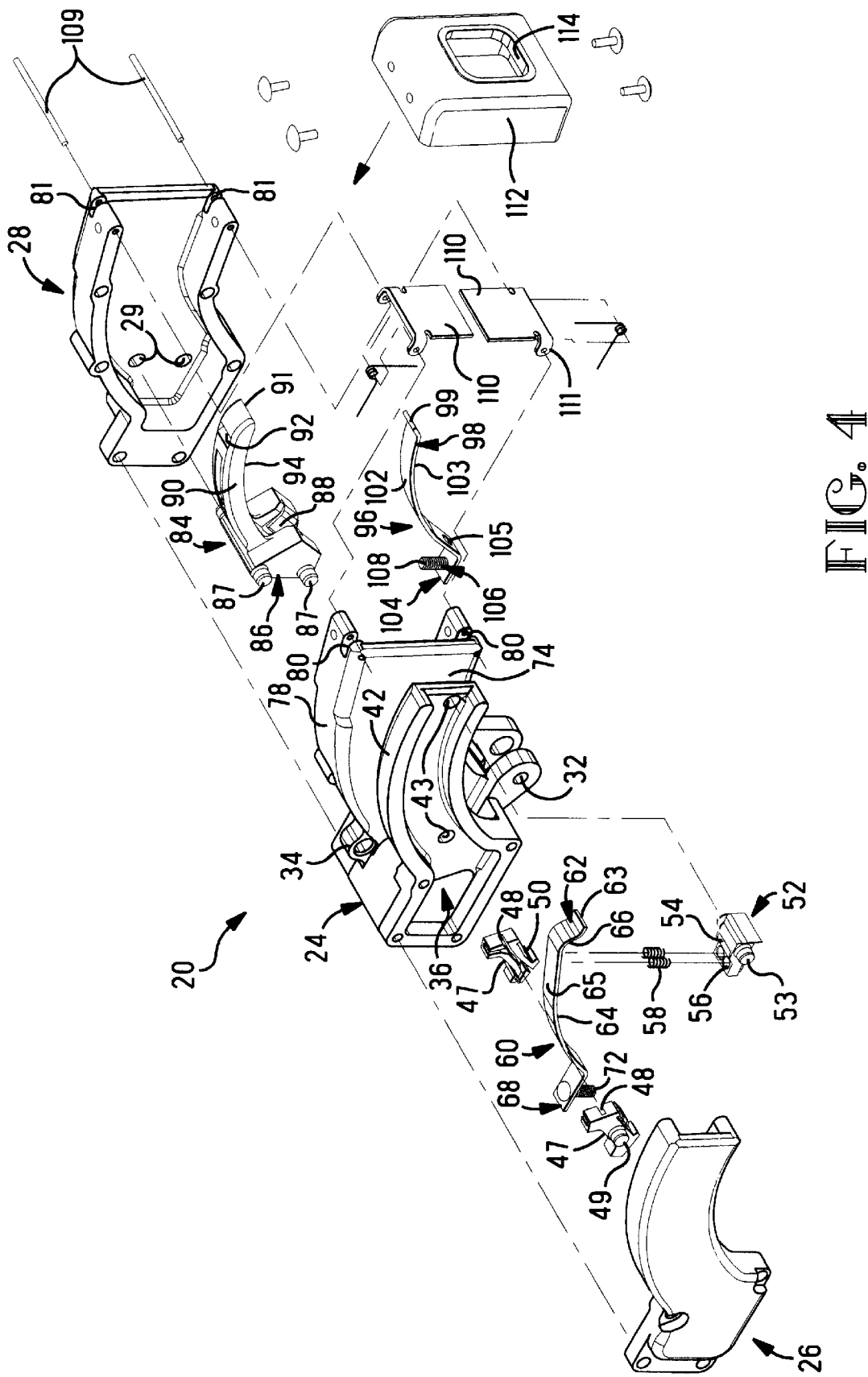
FIG. 4 is an exploded view of one embodiment of the connector.

Referring now to FIGS. 1, 2 and 3, the present invention is directed to a pivotal connector such as connectors 20 (FIG. 2) and 120 (FIGS. 1 and 3) that are mountable to gladhands 6 clamped on an air hose 4 of a braking system between two railroad cars 2 such as shown in FIG. 1. Connector 120 is terminated to ends of electrical cable 116 as best seen in FIG. 3. For purposes of illustration cables 116 have been eliminated from FIG. 2. The gladhands and connectors 120 are supported from the coupler mechanism by lanyards 9. These lanyards prevent the gladhands 6 and connectors 120 from dragging in dirt or hitting the rails when the gladhands and connectors are not mated.

The details of connector assembly 20 are best understood by referring to FIGS. 2, and 4 through 7. Connector 20 includes a housing 22 having a center portion 24, a first cover 26 and a second cover 28 which together define a junction box 36, a first connecting or plug portion 40 and a second connecting or receptacle portion 76. The housing 22 is assembled by means of screws or other fasteners such as rivets or the like (not shown). In the example shown, first connecting or plug portion 40 includes a resiliently mounted contact 60 and second connecting or receptacle portion 76 includes a rigidly mounted contact 96. It is to be understood that the resiliently mounted and rigidly mounted contacts may be used in either of the portions. Extending outwardly from center housing portion 24 are three lugs 32, two at the forward end of connector housing and one at the rearward end thereof. Each lug 32 includes an aperture therein for use in securing connector 20 to the air hose 4 and glad hand 6. The rearward lug 32 includes a stabilizing portion 30 used in positioning the connector 20 to the hose with clamp 8 as best seen in FIG. 2. Other restraints such as a tie wrap or cord also may be used. The exterior surface of 24 further includes upwardly directed lug 34 for attaching the lanyard 9 as depicted in FIG. 1. The junction box 36 at the rear of center portion 24 includes a aperture 38 for receiving cable 116 therein and for directing the conductors 117 within cable 116 to the respective contacts 60, 96.

Figure 5:
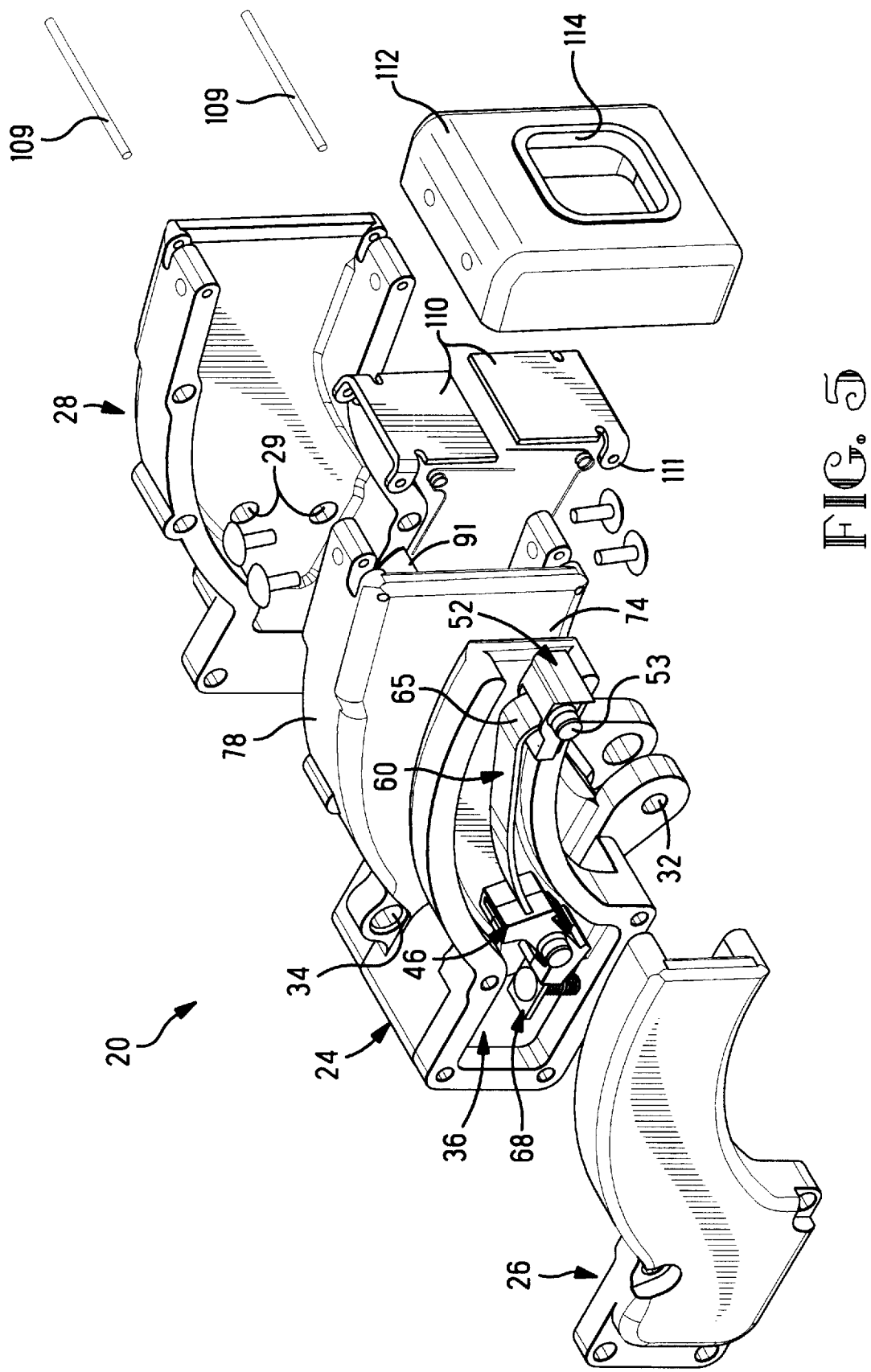
FIG. 5 is a partially assembled view of the connector of FIG. 4.
Figure 6:
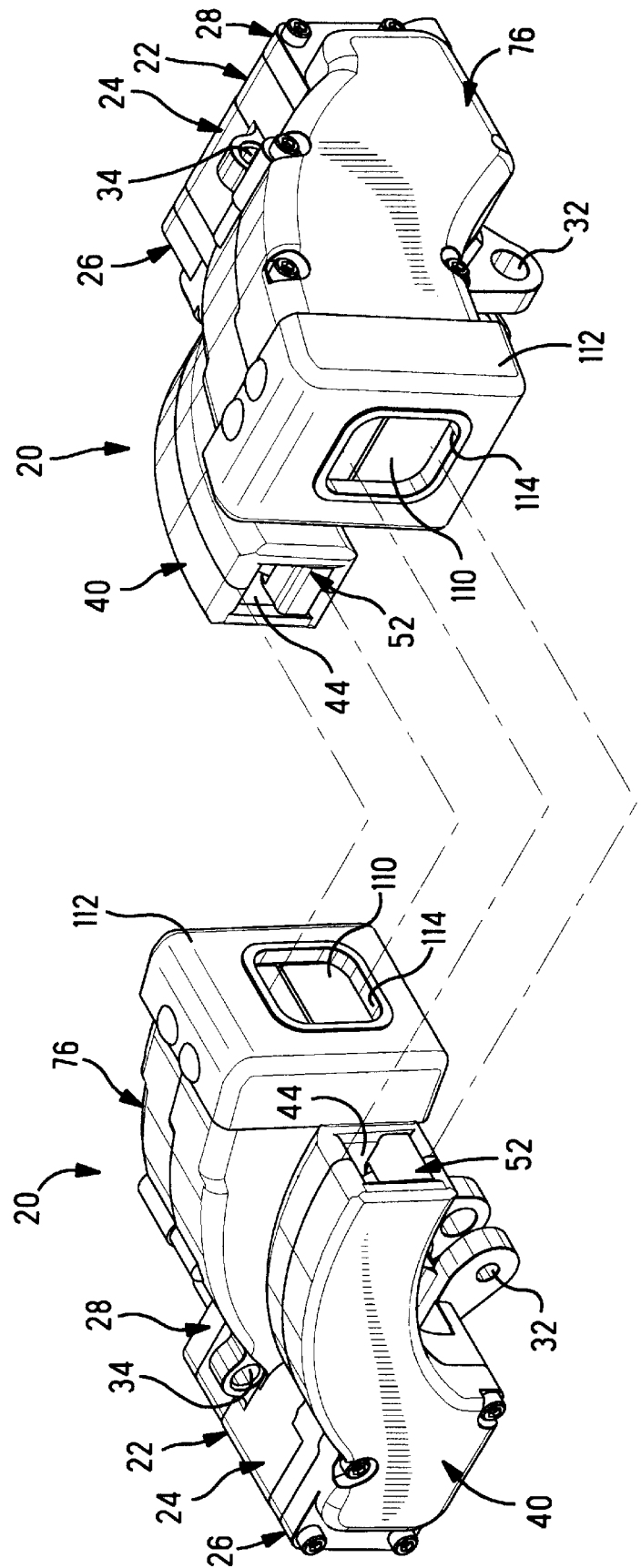
FIG. 6 is a perspective view of two fully assembled connectors of FIG. 4 as they are positioned to mate with each other.
Figure 7:
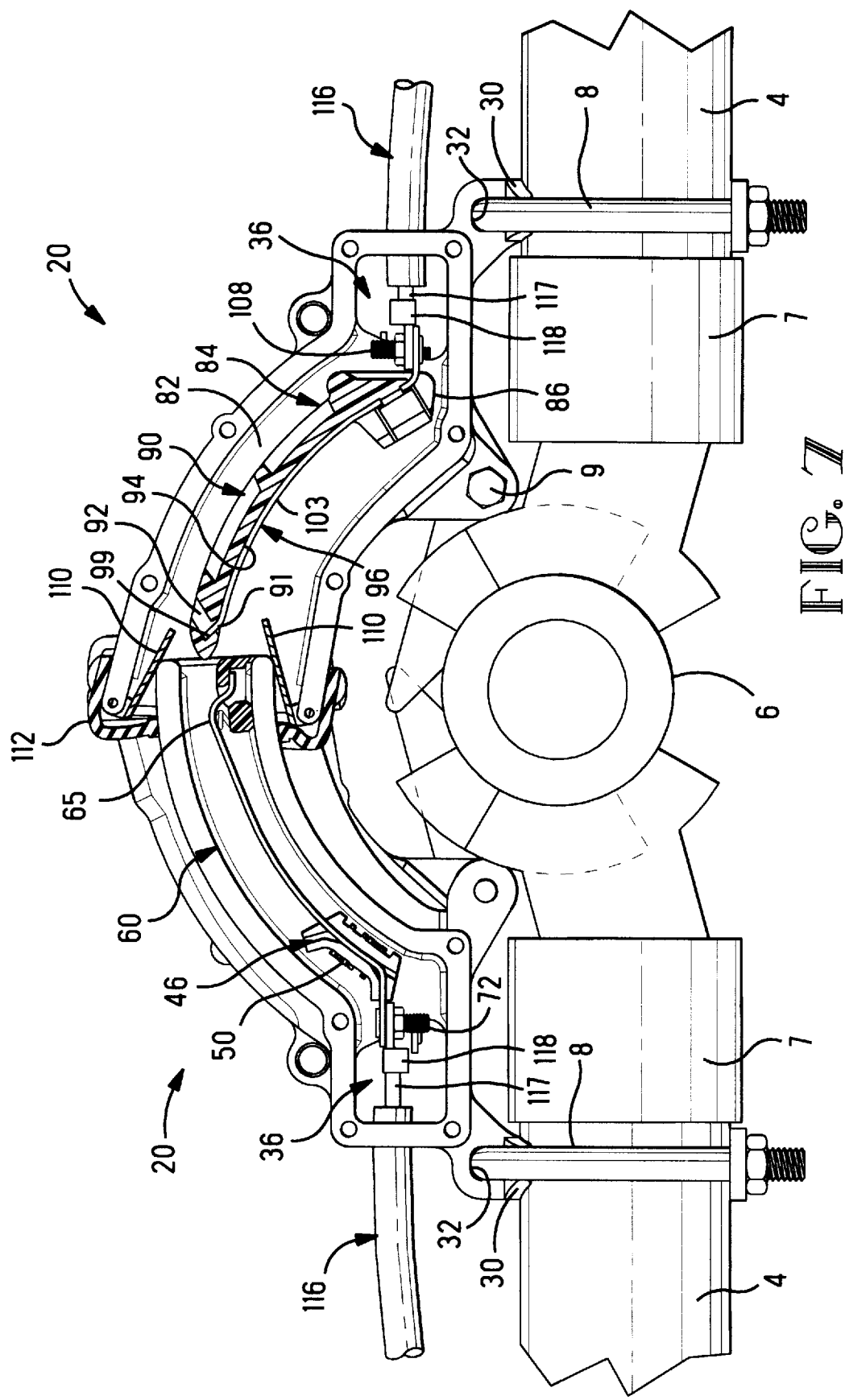
FIG. 7 is a partially sectioned view of two fully assembled connectors of FIG. 4 mounted to respective gladhands and positioned to mate with each other.

As shown in FIGS. 4 through 7, first connecting portion 40 is a plug or male portion of the connector formed by sidewall 42 in center housing 24 and cover 26 which together define a contact receiving cavity 44. First connecting section 40 further includes a dielectric contact mounting block 46 comprised of hermaphroditic parts 47 having slot 48 therein for receiving contact 60. The contact mounting blocks further include pegs 49 for being received in corresponding apertures 43 of sidewall 42 and corresponding apertures (not shown) in sidewall 26. Portions 47 further include latch 50 for securing the two halves together. First connecting portion further includes a spring holding block 52 mounted at the forward end of the passage of contact receiving cavity 44. The spring holding block 52 includes mounting peg 53 for engaging the forward aperture 43 in sidewall 42, and a corresponding aperture (not shown) in sidewall 26, spring receiving apertures 56 and a slot 54 adapted to receive leading end 63 of contact 60 therein. Springs 58 are received in the apertures 56. The first portion contact is a resiliently mounted contact 60 having a first connecting portion 62 and a second connecting portion 68. First connecting portion 62 includes an arcuate arm 64 having an elongate contact or mating surface 65 on the upper side and a spring engaging surface 66 on the lower side thereof. The second connecting section 68 includes an aperture 70 for receiving a stud 72 adapted to receive a ring terminal from a wire 117 as shown in FIG. 7. In assembling the first connecting portion 40 the rearward end of the arcuate arm 64 of contact 60 is inserted into slot 48 of the contact mounting blocks 47 and the corresponding mounting pegs 49 are inserted into respective holes 43, the leading end 63 of contact 60 is disposed in slot 54 of the spring holding block 52 such that the spring holding surface 66 of contact 60 and the apertures 56 capture springs 58 therebetween, as best seen in FIGS. 5 and 7.

Second connecting portion 76 is formed from sidewall 78 in center housing portion 24 and cover 28 together defining a contact receiving cavity 82. Contact receiving cavity 82 is dimensioned to receive the mating plug portion of a complementary connector. The second connecting portion 76 is a receptacle or female portion of the connector 20 and is separated from the plug portion 40 by space 74 dimensioned to receive a wall of a complementary mating connector therebetween. The sidewall of portion 78 and cover 28 include apertures, for receiving contact mounting block 84 therein with only apertures 29 in sidewall 28 being shown. The leading ends of sidewalls 78 and 28 include slots 80, 81 respectively for receiving spring loaded doors 110 therein as more fully explained below. The dielectric contact mounting block 84 includes a base 86 having outward extending pegs 87 dimensioned to be received in the apertures 79, 29 respectively. Extending outwardly from base 86 is an arcuate arm 90 having a leading end 91 and a contact receiving slot 92 therein. Contact 96 is rigidly mounted within contact mounting block 84 and arcuate arm 90. Contact 96 includes a first connecting section 98 and a second connecting section 104. First connecting section 98 includes an arcuate arm 102 having a contact surface 103 on the lower surface thereof defining an elongate mating path thereon, the arcuate contact arm 102 extending to an upturned leading end 99. Arcuate contact arm 102 further includes an aperture 105 at the inner end thereof for receiving a protrusion of base 86 to hold contact arm 102 in position and prevent leading end 99 of contact 96 from sliding out of slot 92. Latches 88 on the side of base 86 hold the end of inner contact in base 86. Second connecting section 104 includes an aperture 106 for receiving a stud 108 therein.

As shown in FIG. 5, the rubber seal 112 has an aperture 114 dimensioned to receive the complimentary plug portion 40 of the mating connector 20 in a sealing relationship. The seal 112 and the hingeable doors 110 prevent debris from entering a connector 20 mounted to a gladhand 6 when it is not mated to complimentary connector such as at the last car of a train or if the car is coupled to a car not equipped with the EP braking system.

When mounting the contact 96 in the contact mounting block 84, as best seen in FIG. 7, the leading end 99 is received in the contact receiving slot 92 of arcuate dielectric arm 90 with the other end of arcuate contact arm being received in slot 94 of base 86. Dielectric arm 90 extends along the outer surface of the arcuate contact arm 102 thereby securing the contact 96 rigidly within the contact receiving cavity 82. As shown in FIG. 7 to assemble connector assembly 120 to the cable 116, a ring tongue terminal 118 is terminated to the wire 117 in cable 116 and positioned on the stud 108 and secured thereto. The assembly is held on airhose 4 and gladhand 6 by means of clamp 8 and bolt 9 or a similar type of restraint.

In the preferred embodiment connector assembly is hermaphroditic as shown in FIG. 6, wherein two connectors 20 are aligned for mating with each other.

FIG. 7 shows the two connectors 20 mounted to respective gladhand 6 and clamped thereto as they begin engagement. The doors 110 are open with the seal 112 gripping the outer surface of the plug portion 40 as it enters the mating cavity 82. Details of the operation of the contacts as the connectors are mated is discussed more fully with relation to the embodiment 120 shown in FIGS. 8 through 13.

Figure 8:
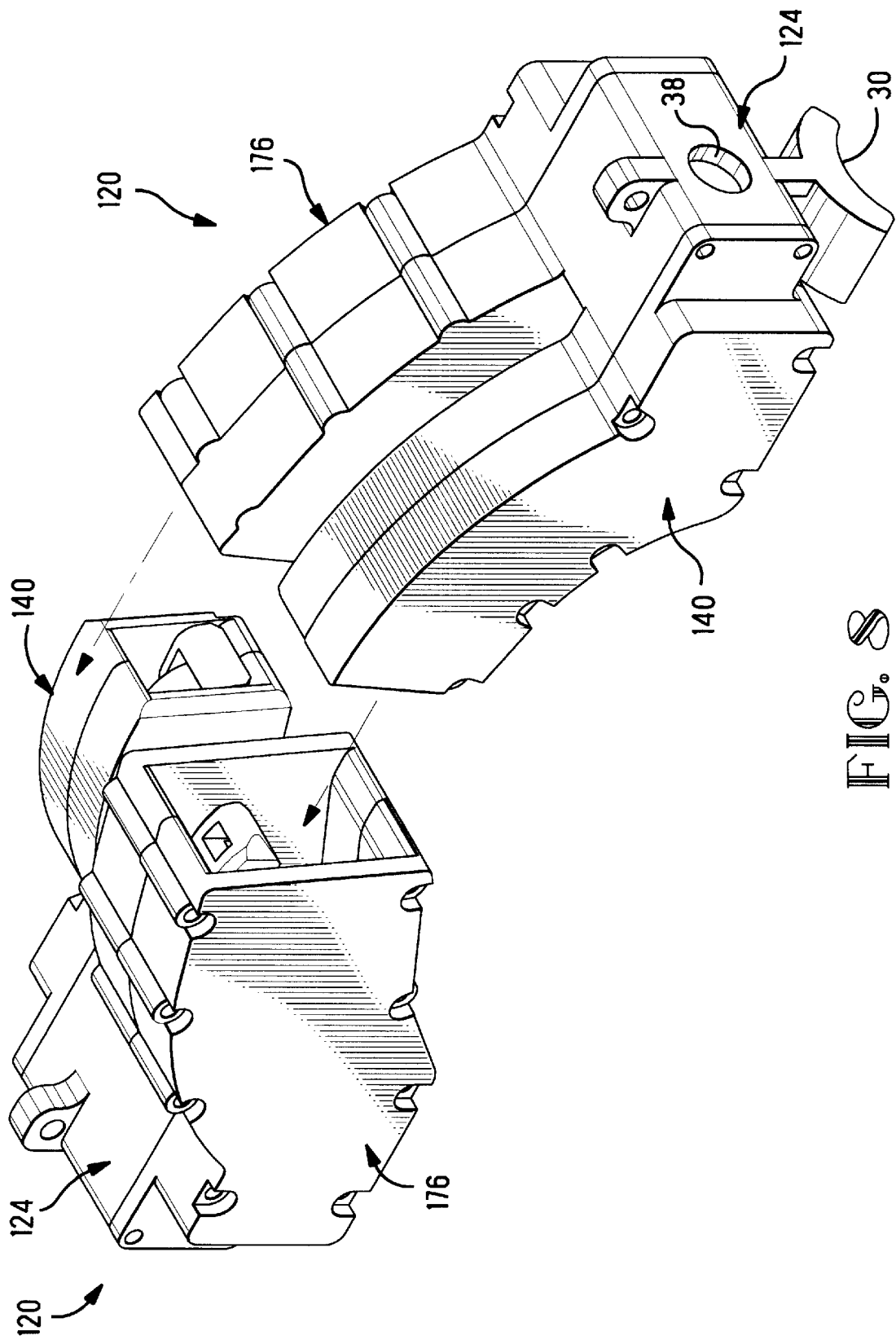
FIG. 8 is a perspective view of an alternate embodiment of the hermaphroditic connector assembly.
Figure 9:
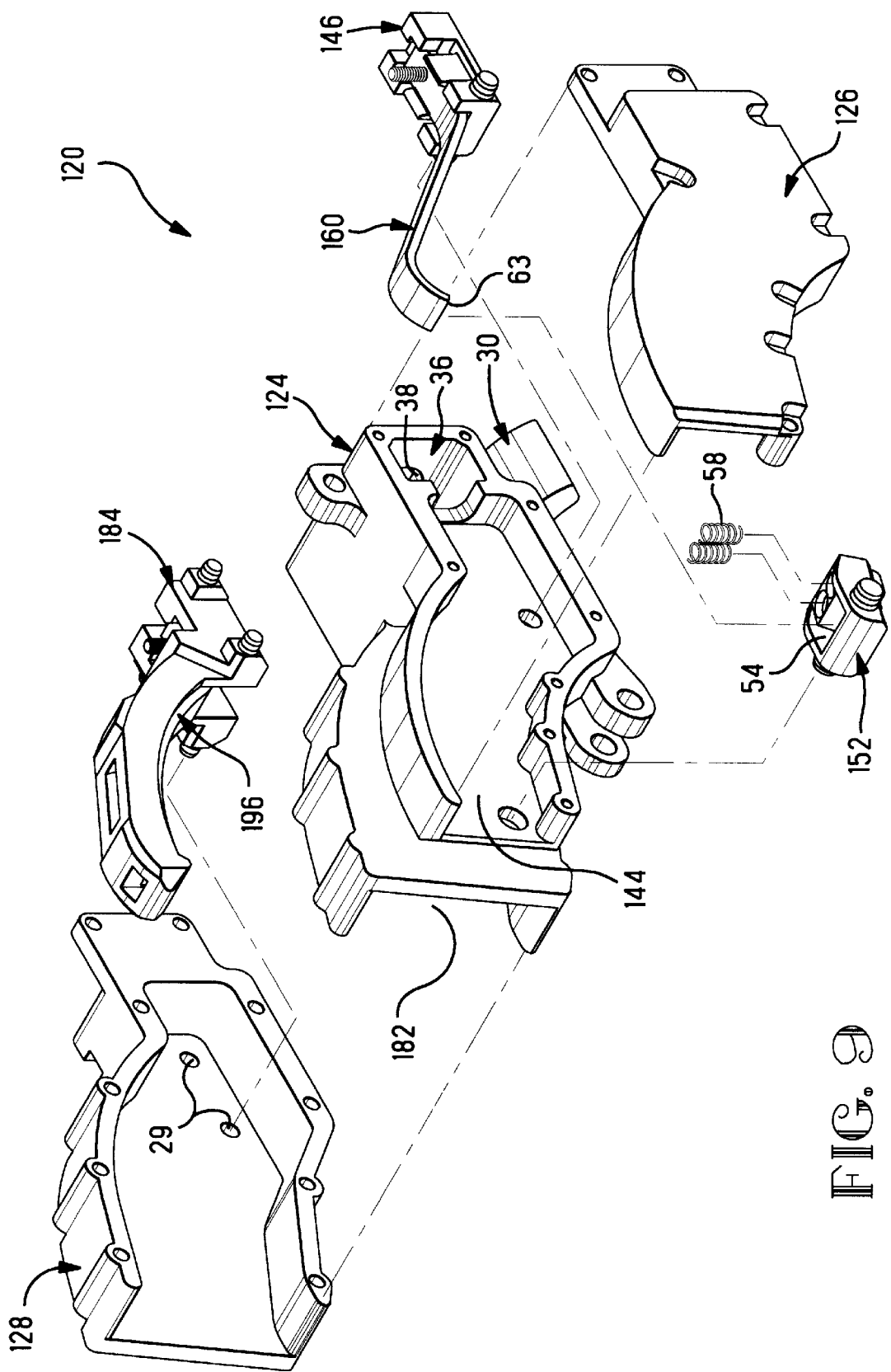
FIG. 9 is a partially exploded view of the embodiment of FIG. 8.
Figure 10:
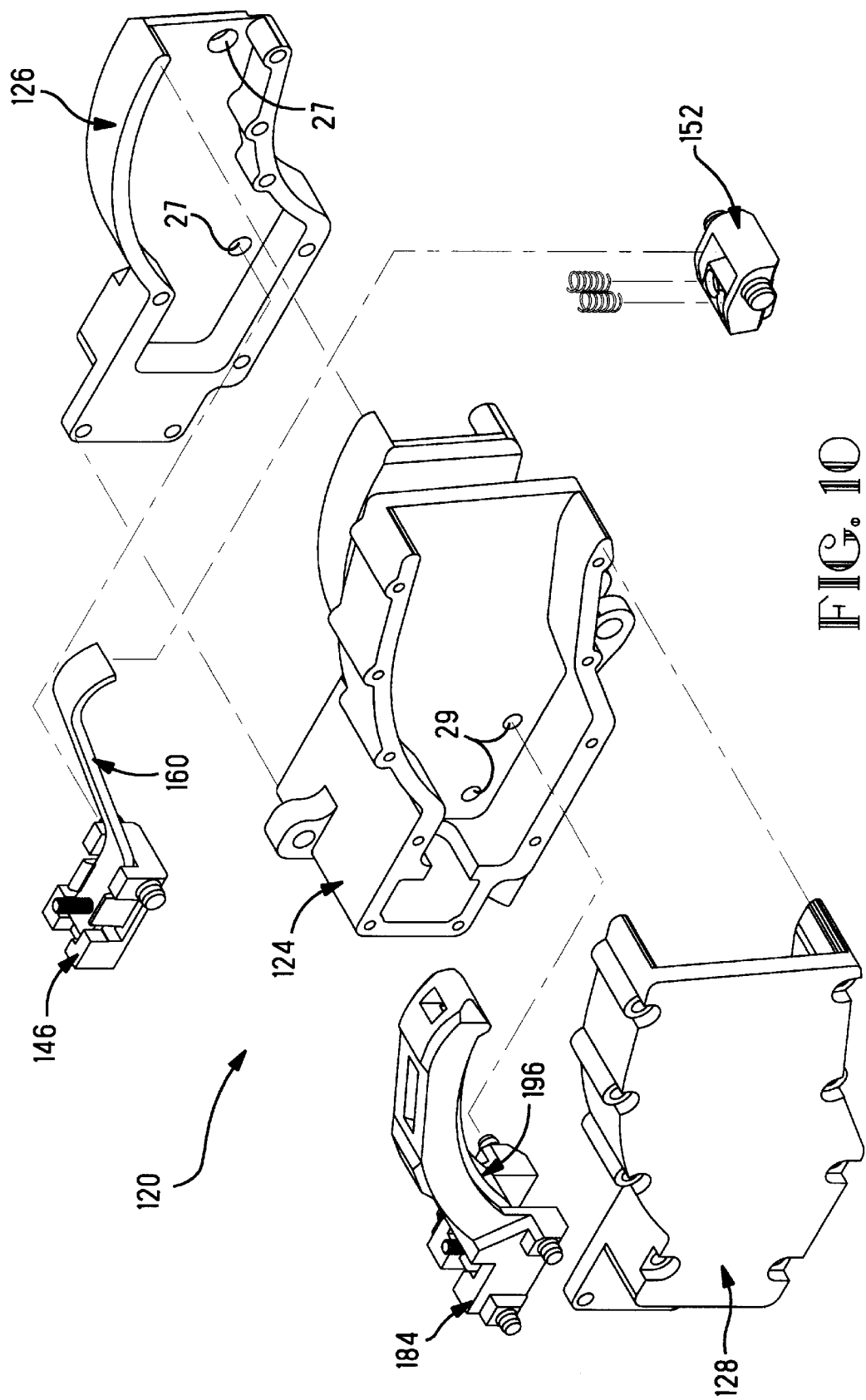
FIG. 10 is a partially exploded view of the embodiment of FIG. 8 from the another direction.

FIGS. 8 through 10 illustrate the assembly of connector embodiment 120 having a plug portion 140 and a receptacle portion 176. Embodiment 120 is similar to embodiment 20 except that the plug and receptacle portions 140, 176 are reversed with respect to each other and the respective contacts 160, 196 are mounted in blocks having a slightly different configuration than those previously described. Wherever possible the same number system has been used for describing this embodiment. Assembly 120 includes a center housing portion 124 and covers 126, 128 respectively. The center housing 124 and cover 126 together define a contact receiving cavity 144 dimensioned to receive resiliently mounted contact 160. The contact 160 is mounted at the rearward end thereof in a contact mounting block 146 which is mounted to housing sidewalls in a manner similar to the one previously described. The leading end of the contact 63 is engaged in a slot 54 of the spring holding block 152. The rigidly held contact 196 is held within the contact mounting block 184. The center section housing and cover 128 together define a contact receiving and mating cavity 182 therebetween.

Figure 11:
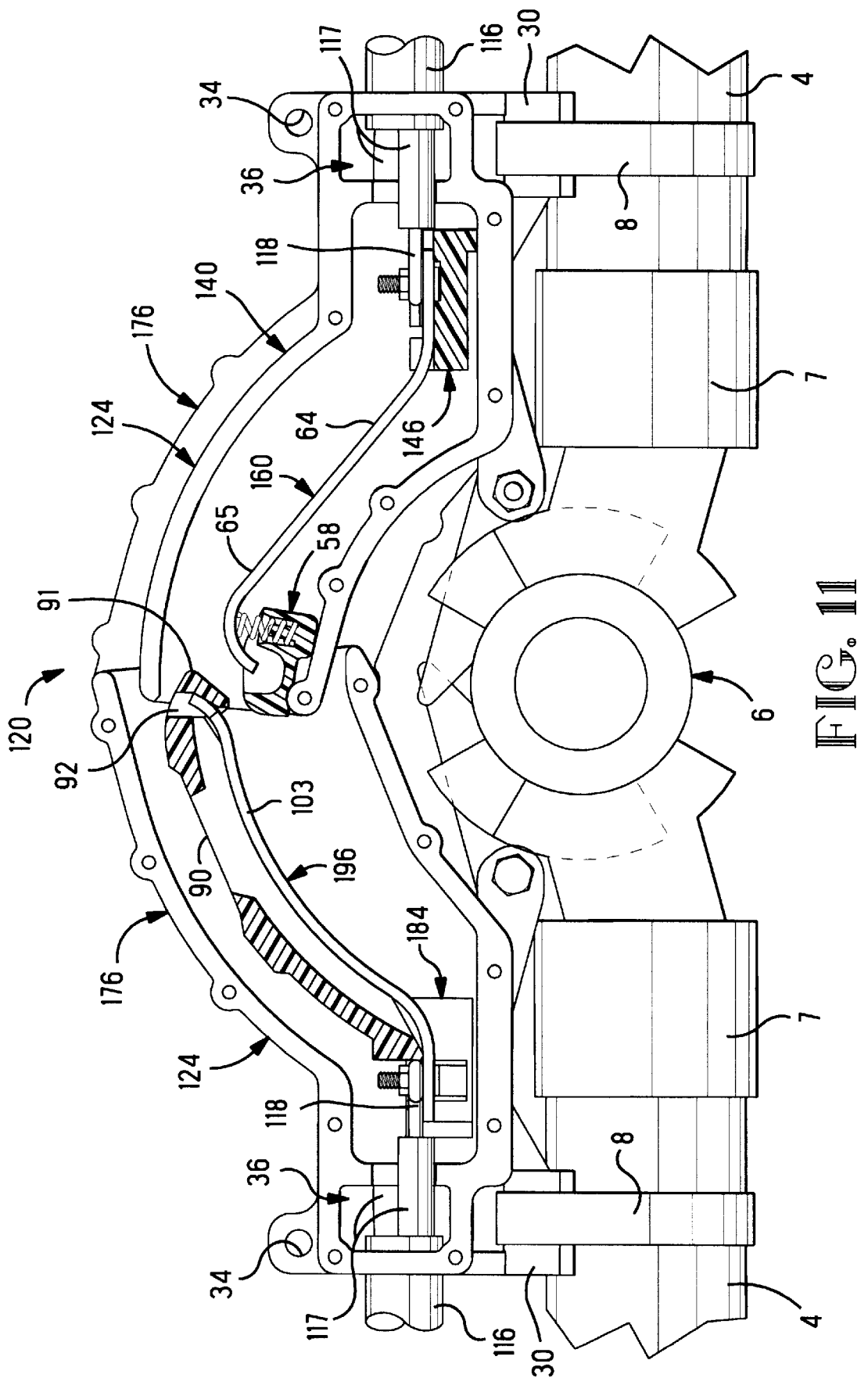
FIGS. 11 through 13 illustrate the sequence of mating of the connectors of FIG. 8 mounted to the gladhand.
Figure 12:
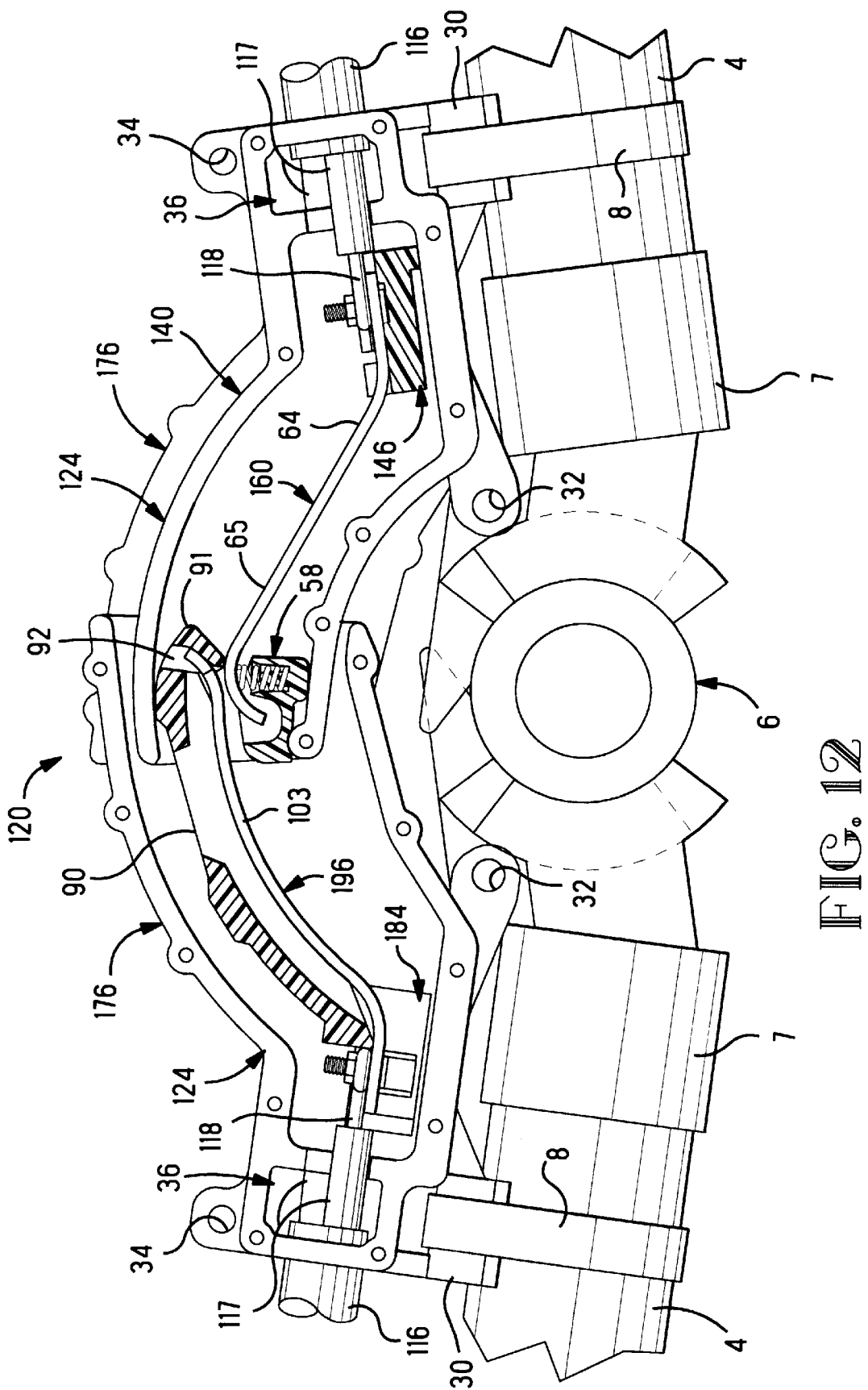
Figure 13:
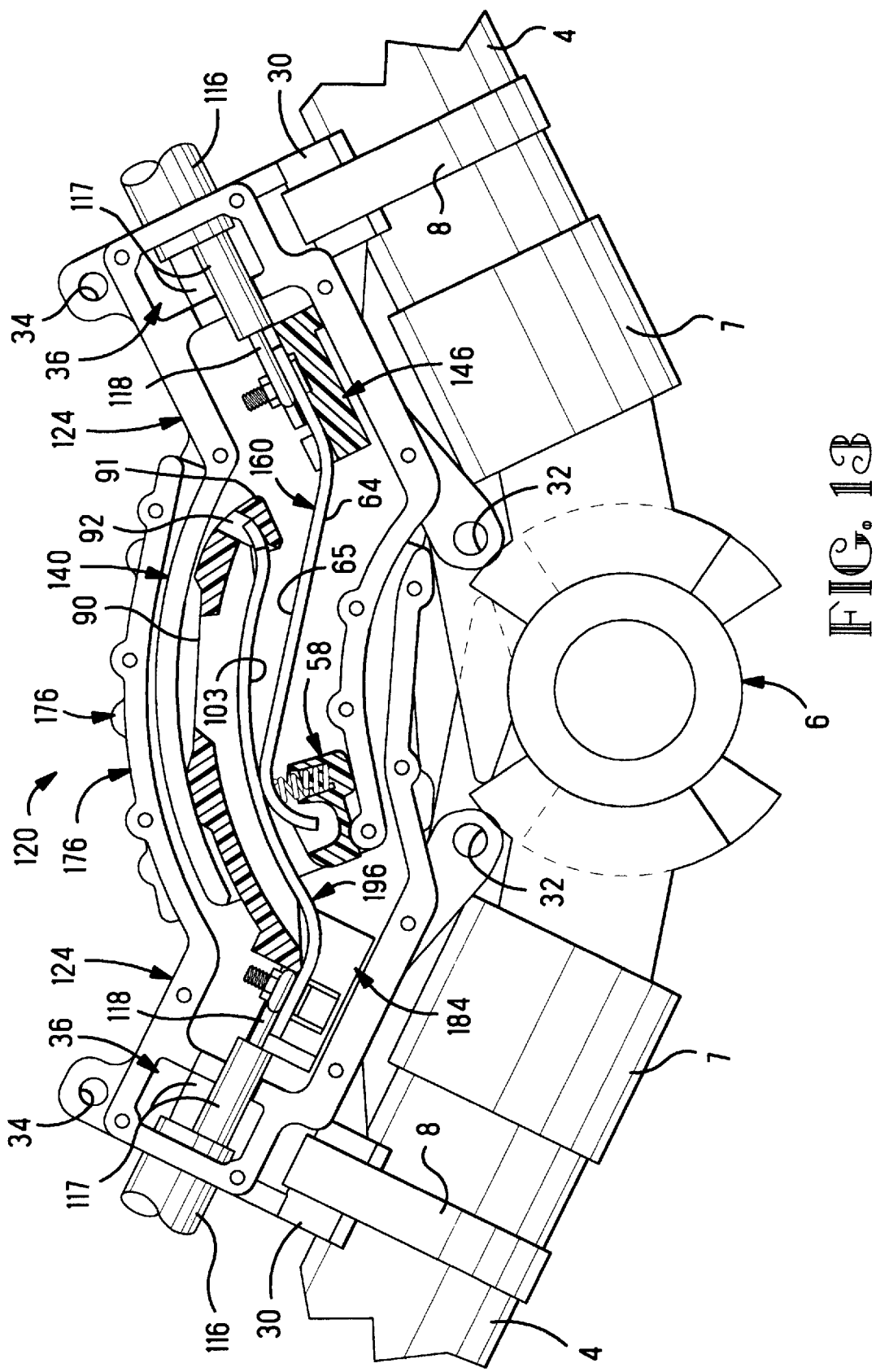

FIGS. 11 through 13 are sectional views taken through respective connector assemblies 120 mounted to corresponding gladhands and illustrate the mating of the contacts 196, 160 as the gladhands are rotated to their final position. FIG. 11 shows plug connector 140 on one gladhand and having contact 160 mounted within the contact receiving cavity 144 and the receptacle portion 176 mounted to a second gladhand 6 and the rigidly mounted contact 196 beginning to enter the cavity 144. As the gladhands 6 and connector assemblies 120 are rotated in a first angular direction the leading end 91 of the dielectric arcuate arm of contact mounting block 184 engages the contact surface 65 of the flexible member and deflects the resilient contact 160 downwardly to prevent stubbing of the contacts during initial mating engagement as shown in FIG. 12. FIG. 13 shows the connector assemblies and gladhands upon full rotation thereof whereby the arcuate contact surface 65 of the flexible contact 60 is engaged with the arcuate contact surface 103 of rigid contact 96. As shown in these Figures, the spring 58 is compressed against surface 66 of contact 60 to provide sufficient normal force between the contact surface 65 and arcuate mating surface 103 to assure electrical connection therebetween. The design of the connector assembly of the present invention provides a wiping force as the contact surfaces are brought into electrical engagement. As can be appreciated, the contacts can accommodate a wide range of arcuate distance while remaining electrically connected to each other. The configuration of the contacts 60, 96 and 160, 196 assure that electrical connection is made therebetween substantially along the entire length of mating surface 103. Thus should the air hoses and gladhands between two cars of a train be short such that the gladhands can not be closed to their fully locked position, the electrical connection will still be maintained between the contacts.

The connectors and the gladhands to which they are mounted are unmated when the railroad cars are uncoupled. As the cars are pulled apart, the hose lines straighten and the gladhands with the attached connectors pivot. When the hoses are fully straightened and stretched out, the gladhands and connectors can be pulled straight apart. Alternatively the gladhands and connectors can be uncoupled by hand.

FIGS. 14 and 15 disclose an alternative embodiment 220 of the present invention in which the center housing portion 224 is cast integrally with a gladhand 6 thus minimizing parts. Preferably the material between the gladhand 6 and receptacle portion 76 includes a rib 221 which provides additional structural support proximate the mating end of the connector 220. The connector of embodiment 220 is matable with a gladhand having a separately mounted connector 20 and the gladhand 6 of embodiment 220 is connectable with a gladhand of a car not having the EP braking system.

Figure 16:
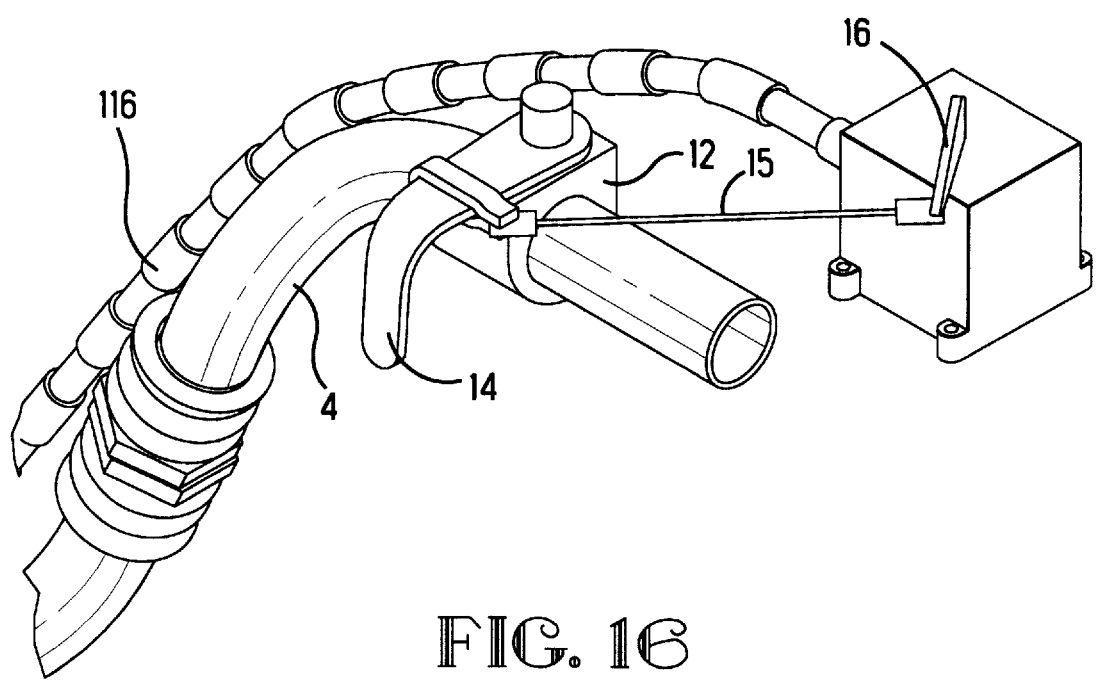
FIG. 16 is an enlarged fragmentary diagrammatic view of a safety switch assembly connected to the air valve of the airbrake system.

FIG. 16 illustrates a safety feature that may be used in conjunction with the present connector system in which the air valve 12 of the air hose 4 is attached to a rotary switch 16 in a junction box mounted to a railroad car 2. When the air valve 12 is in the opened position, the switch 16 in the junction box is in the on position, air can flow through the brake pipe and hose and electrical current can flow through the connector assembly 120. When the air valve is closed such as when cars are going to be disconnected, the switch 16 is moved automatically to the off position thereby preventing electricity from flowing through the connector assembly 120.

Figure 17:
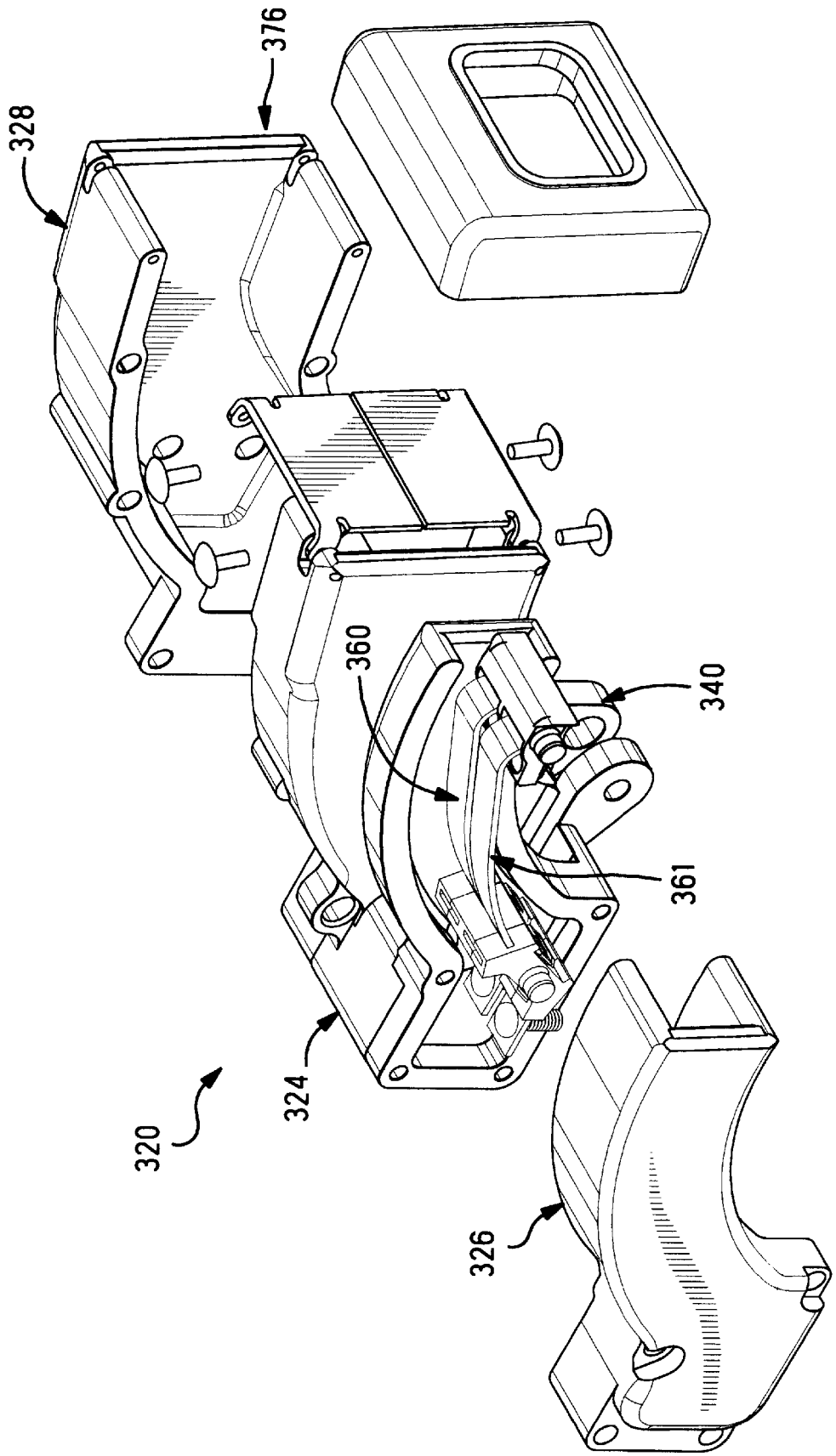
FIG. 17 is a partially exploded view of a further embodiment of the present invention showing the plug portion wherein the plug portion includes two contacts, one for signal or power and the other for ground.
Figure 18:
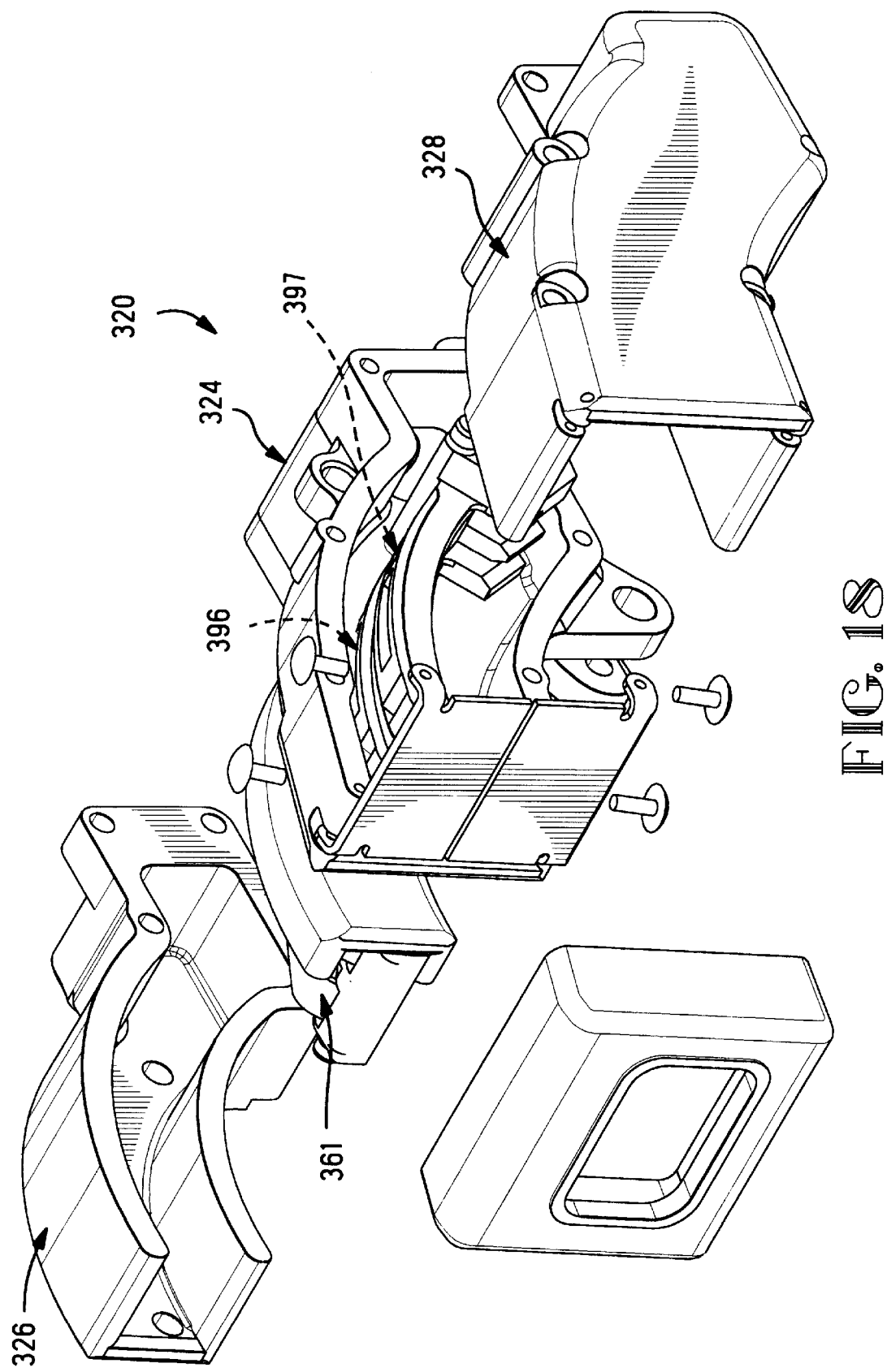
FIG. 18 is a partially exploded view of the connector embodiment of FIG. 17 illustrating the assembly of the receptacle portion wherein the receptacle portion includes two contacts, one for signal or power and the other for ground.

FIGS. 17 and 18 illustrate connector embodiment 320 in which plug 340 and receptacle 376 have two contacts each, one 360, 396 for signal or power and the other 361, 397 for ground. To retain the hermaphroditic nature of the connector, the ground contacts 361, 397 are adjacent the covers 326, 328 of the connector and the signal or power contacts 360, 396 are adjacent the walls of the central housing 324. It is to be understood that the reverse arrangement also may be used. The ground wire from the cable is split and attached to both ground contacts, 361, 397, to provide a ground.

Figure 19:
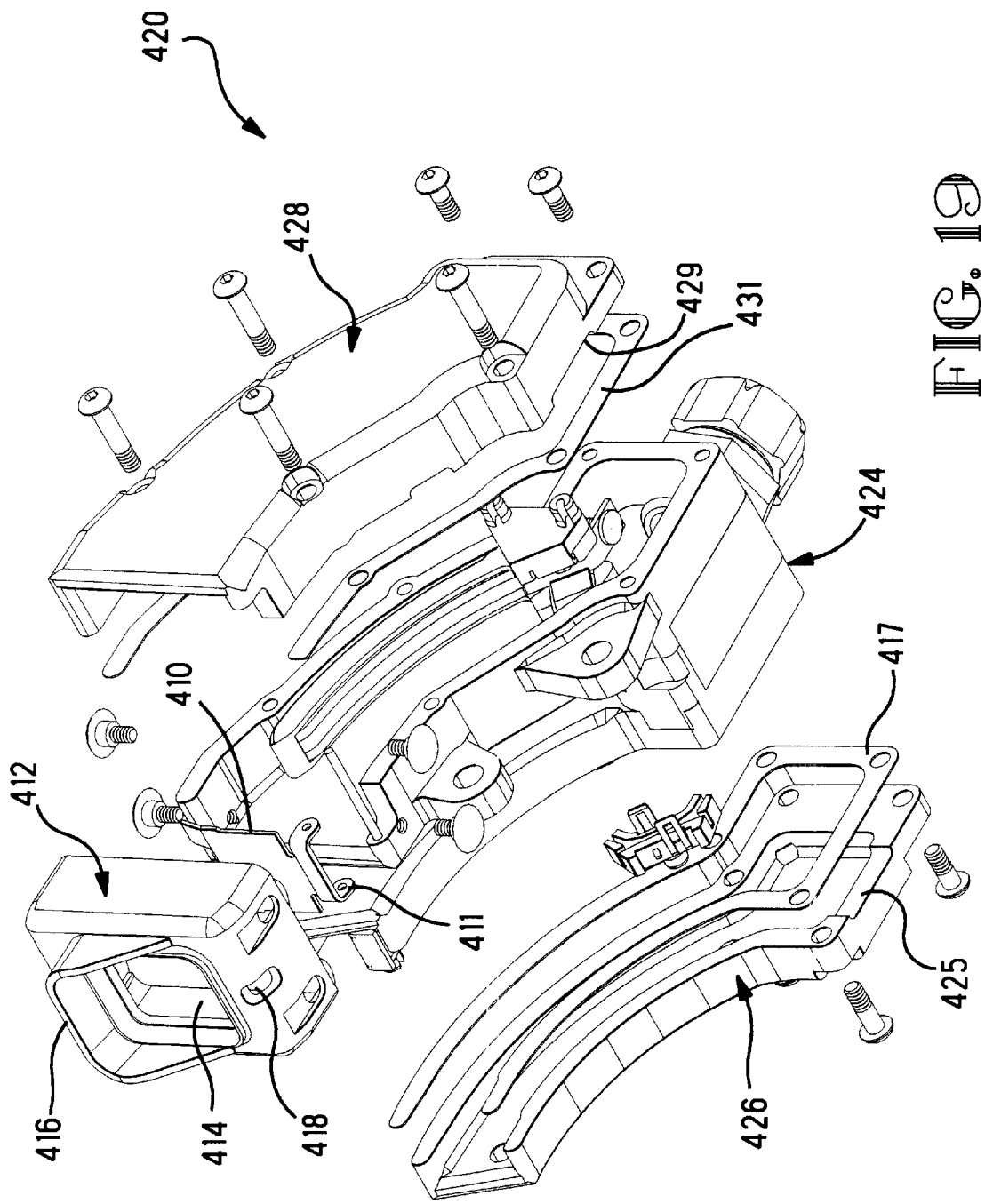
FIG. 19 is a partially exploded view of a further embodiment of the invention wherein the assembly is provided with gaskets to minimize entry of moisture into the housing and means for draining moisture from the housings.
Figure 20:
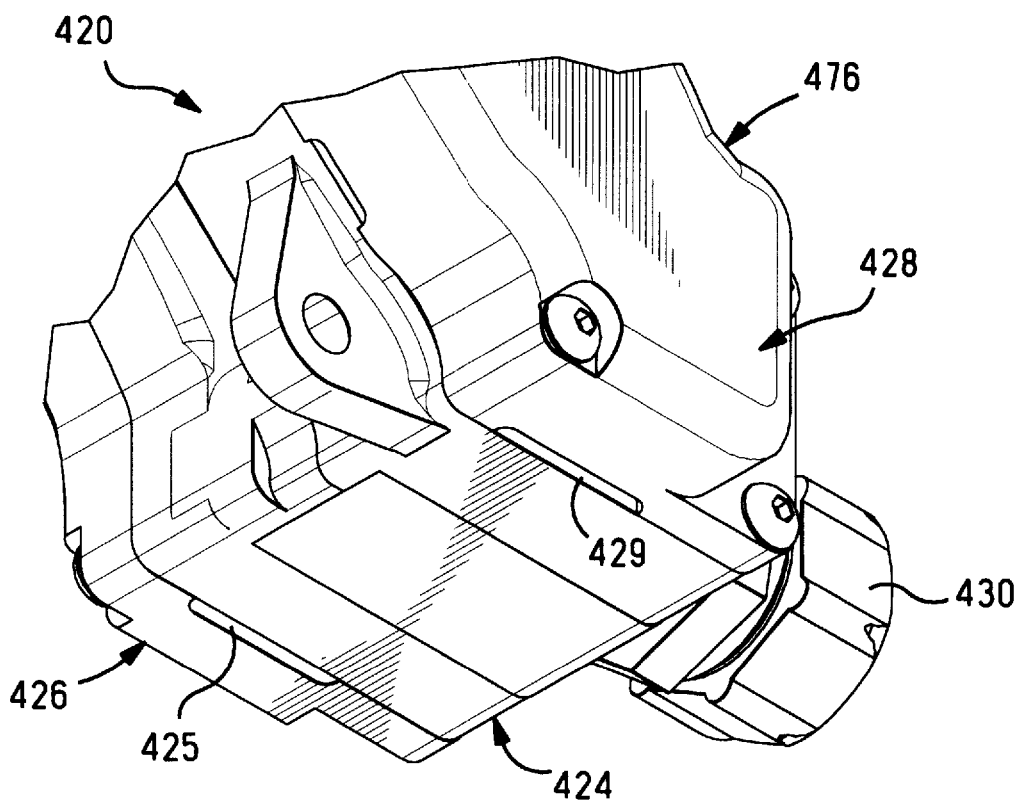
FIG. 20 is an enlarged fragmentary view of a portion of the assembled embodiment of FIG. 19 illustrating the openings for draining moisture from the housings.
Figure 21:
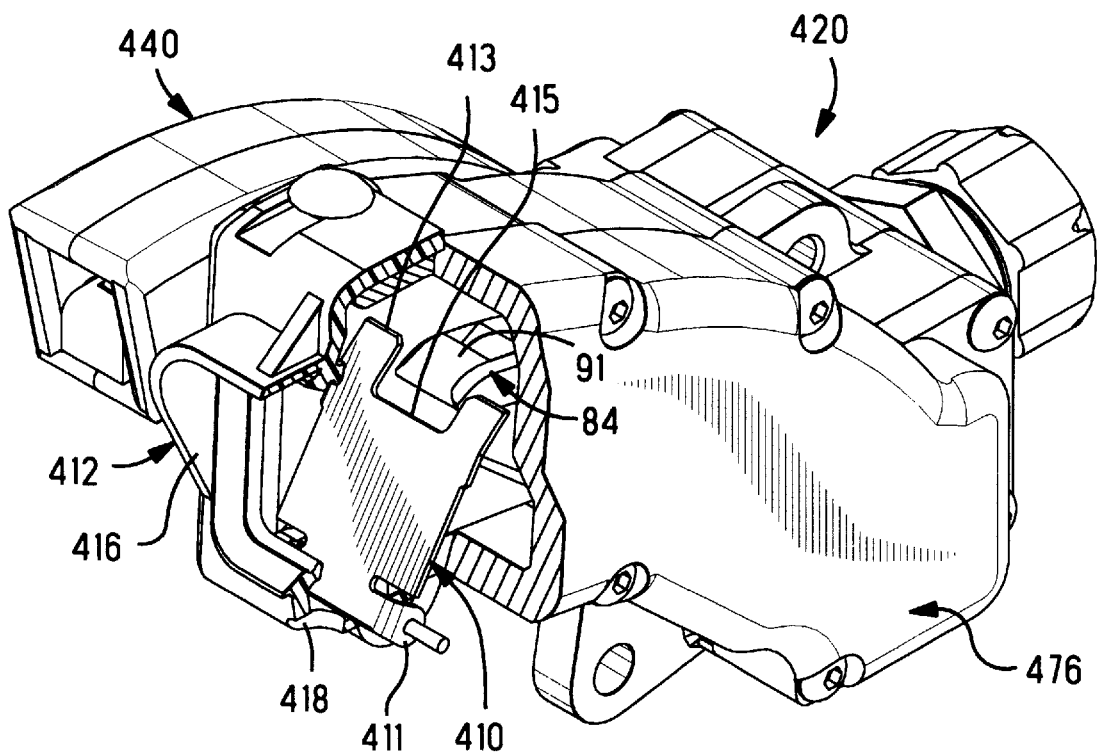
FIG. 21 is an isometric view of the assembled embodiment of FIG. 19 further illustrating an alternative embodiment of a front seal for the one connecting portion.

FIGS. 19–21 illustrate a further embodiment 420 of the invention having improved sealing and, in addition, drainage apertures for allowing any moisture that may accumulate in the housing to drain therefrom. Referring first to FIGS. 19 and 20, the structure of embodiment 420 is substantially the same as in embodiment 20 as previously described. Assembly 420 includes a center housing portion 424 and first cover 426 and second cover 428. To improve the sealing between the connector housing 424 and the respective covers 426, 428, gaskets 417, 429 respectively are placed between the housing covers 426, 428 and the center housing 424. Covers 426 and 428 further include recesses 425, 429 at the lower edge thereof which define drainage slots when the covers 426, 428 are assembled to the housing 424. Thus any snow or ice that might accumulate in an unmated assembly at the end of a train or between cars when the coupled car does not have such a connector can melt and flow out of the connector assembly.

FIG. 19 further shows an alternative means for mounting the connector assembly 420 in which housing 424 includes two spaced apart mounting lugs 432 that are adapted to be secured to cooperating lugs on the gladhands (not shown) thus eliminating the use of a clamp around the air hose.

Embodiment 420 further has an improved seal 412 at the forward end of the second connecting portion 476, as best seen in FIGS. 19 and 21. The seal 412 includes a hood 416 which helps to protect the assembly and an aperture 414 therein dimensioned to receive the complementary plug portion 440 of the mating connector 420 in a sealing relationship. Additionally, seal 412 includes an aperture 418 for allowing moisture to drain therefrom should ice or snow accumulate in the forward portion of the unmated assembly that is hanging down towards the ground.

Embodiment 420 includes a single hingeable door 410 that prevents debris from entering the connector 420 when it is not mated to a complimentary connector such as in the last car of the train or if the car is coupled to another car not equipped with the EP braking system. Hingeable door 410 is mounted on a rod through apertures 411 at the lower end thereof. The mating free end 413 includes a recess 415 dimensioned to allow the door to move past the leading end 91 of contact 84 when the connector is mated to its complementary connector.

Figure 22:
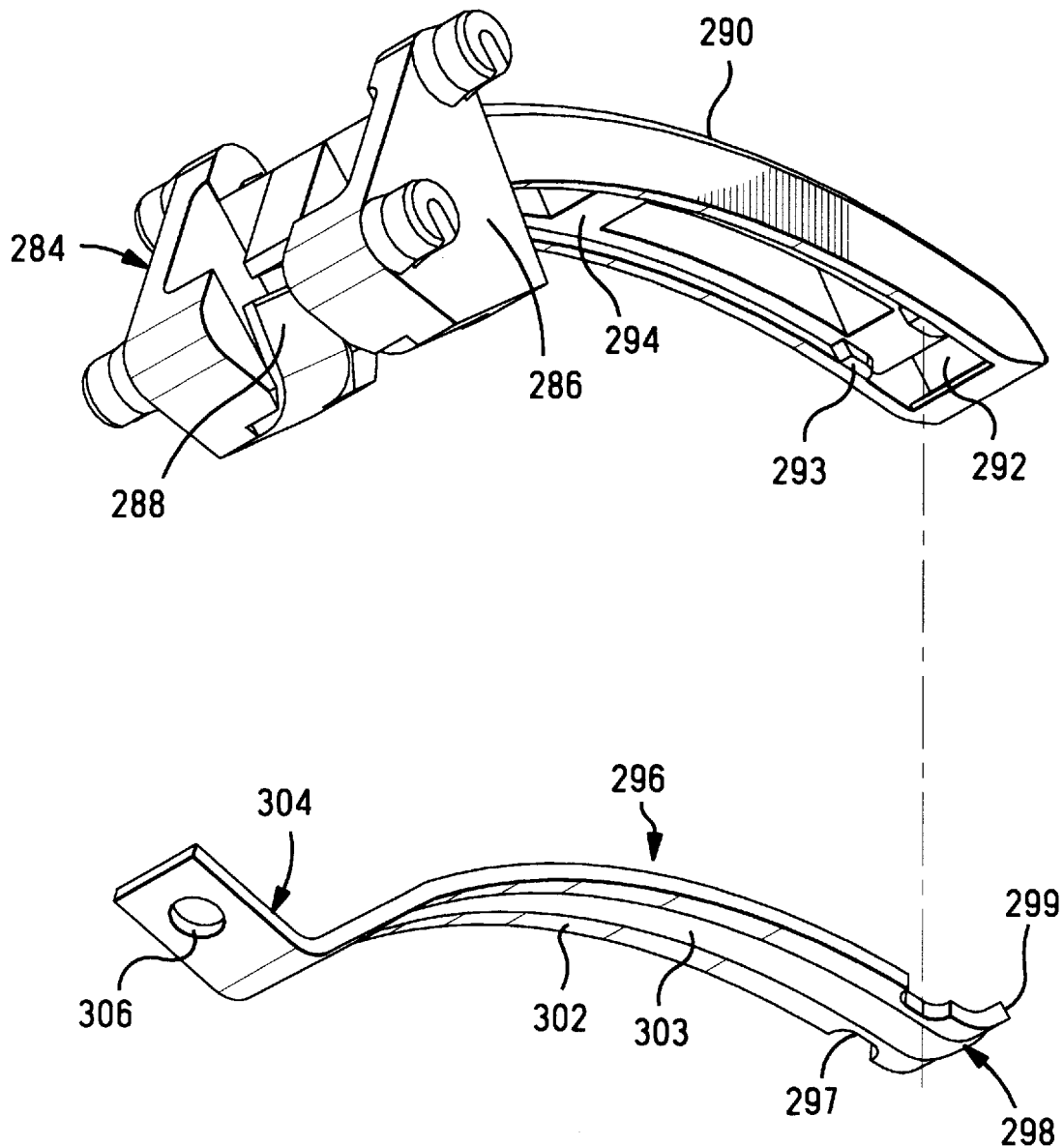
FIG. 22 is an exploded isometric view of an alternative embodiment of the rigidly mounted contact and contact mounting block.

FIG. 22 shows alternative embodiments 296, 284, of the rigidly mounted contact and contact mounting block, respectively. Contact 296 includes a first connecting section 298 and a second connecting portion 304. The first connecting section 298 includes an arcuate arm 302 having a raised center rib 303 extending therealong. Arcuate arm 302 further includes a pair of notches 297 extending into the arm proximate the leading end 299 thereof. The second connecting portion 304 includes an aperture 306 extending therethrough for receiving stud 108 therein in the same manner as previous described. Contact mounting block 284 include a base 286 having a pair of latches 288 for securing contact 296 therein. Arcuate arm 290 extends outwardly from the base 286 and includes a contact receiving passageway 294 and a contact receiving slot 292 at the leading end thereof. Arcuate arm 290 further includes a pair of projections 293 proximate contact receiving slot at the leading end thereof dimensioned to be received within the pair of notches 297 to secure the leading end of contact 296 in the contact mounting base 286. Contact 296 being held at the forward end thereof eliminate the need for the aperture 105 of contact 96 shown in FIG. 4. The continuous arcuate surface of contact 296 provides improved current carrying capability. The raised rib 303 concentrates the normal force between the mating contacts in the localized area and increases the wiping action between the mating contacts as the connectors are rotated.

The present invention offers a number of advantages. The connector can be mounted readily to a existing brake hoses. Only a minimal amount of electrical work is needed to provide the cars with cable for connection to the respective connectors. The connector is hermaphroditic thereby allowing cars to be connected at either end to another car. The present invention provides an elongate mating path and the contacts are adapted to accommodate a wide range of arcuate distance during the mating of the first and second connectors. The connector assembly furthermore may be used for power, signal, or both, and may further carry additional contacts for providing a ground circuit. Additionally the connector assembly provides a plurality of apertures for allowing moisture to drain from the connector when snow, ice or rain gets into an unmated assembly such as at the end of the train. An accumulation of moisture could be a problem when the connector is mated to another assembly. In the preferred embodiment the connector housing 22 is cast from ductile or malleable iron, which is substantially the same material as the gladhands thus avoiding electrolytic degradation therebetween. It is to be understood, however, that the housings may be molded from a high impact resistant dielectric material suitable for use in a temperature range from about −50° to about 150° F. The dielectric material preferably would also be resistant to ultraviolet degradation. If the housing 22 were made of dielectric material the contact holding blocks and the spring holding block could be integrally molded therewith.

A further advantage of the connector assembly of the present invention is that it is adapted for use with a cable having at least two wires to provide both the outgoing and return electrical paths thereby avoiding interference with electronic devices mounted along the rails used to operate signals, crossing gates and the like. Additionally the cable may also be provided with a ground wire and the connectors with additional contacts to provide outgoing, return, and ground electrical paths.

It is thought that the pivotal electrical connector assembly of the present invention and many of its attendant advantages will be understood from the foregoing description. It is apparent that various changes may be made in the form, construction, and arrangement of parts thereof without departing from the spirit or scope of the invention or sacrificing all of its material advantages.

I claim:

1. A pivotal connector assembly comprising:
   first and second matable connectors, said first and second connectors adapted to be brought into mated engagement by rotating said connectors in a first angular direction about a center of pivoting, and adapted to be disengaged by rotating said connectors in an opposite second angular direction about said center of pivoting;

each of said first and second connectors includes a housing having at least one contact mounted therein;

each of said contacts has an elongate arcuate section defining an elongate mating path;

one of said contacts is rigidly mounted within its respective connector housing; and the other of said contacts is resiliently mounted within its respective connector housing such that upon mating of said first and second connectors said arcuate section of said resiliently mounted contact is engaged by the arcuate section of said rigidly mounted contact along said elongate mating path and laterally deflected therefrom under bias, said resiliently mounted contact assuring sufficient mating force between said arcuate sections of said mating contacts;

whereby said contacts are adapted to accommodate a wide range of arcuate distance during mating of said first and second connectors.

2. The pivotal connector assembly of claim 1 wherein each of said first and second connector housings include first and second portions, said first portion having at least one said resiliently mounted contact therein and said second portion having at least one said rigidly mounted contact therein.

3. The pivotal connector assembly of claim 2 wherein said first portion includes therein a pair of said resiliently mounted contacts, one thereof being electrically connected to ground, and said second portion includes therein a pair of said rigidly mounted contacts, one thereof being electrically connected to ground.

4. The pivotal connector assembly of claim 2 wherein said first and second connectors are hermaphroditic.

5. The pivotal connector assembly of claim 1 wherein said contacts are mounted to respective dielectric bodies within the associated housings.

6. The pivotal connector assembly of claim 5 wherein said housings are conductive and said dielectric bodies electrically isolate said contacts from said housings.

7. The pivotal connector assembly of claim 5 wherein said rigidly mounted contact is supported along its length by a portion of said dielectric body.

8. The pivotal connector assembly of claim 1 wherein said resiliently mounted contact is a cantilevered spring arm.

9. The pivotal connector assembly of claim 1 wherein said resiliently mounted contact is deflected toward the center of pivoting during mating.

10. The pivotal connector assembly of claim 1 wherein said housing of said first connector is provided with a seal at a mating face thereof cooperative with said housing of said second housing of said second connector upon mating to seal about said mating face.

11. The pivotal connector assembly of claim 10 wherein said housing of said first connector further includes at least one resiliently mounted door, said door being moved inwardly when said housing is mated with the complementary connector housing to expose said mating face for mating of said first connector.

12. The pivotal connector assembly of claim 1 wherein each housing is provided with at least one opening therein to permit moisture to drain therefrom.

13. The pivotal connector assembly of claim 1 wherein each connector housing is secured to an airhose of a braking system.

14. The pivotal connector assembly of claim 13 wherein each said connector housing is secured to a gladhand of a said airhose of a railroad car.

15. The pivotal connector assembly of claim 14 wherein said connector housing is cast integrally with said gladhand secured to said airhose.

16. The pivotal connector assembly of claim 1 wherein said arcuate section of said rigidly mounted contact includes a raised center rib extending therealong defining a raised mating surface for said resiliently mounted contact.

17. The pivotal connector assembly of claim 16 wherein said rigidly mounted contact is supported along its length by a portion of a dielectric body and said arcuate section of said rigidly mounted contact includes at least one notch at a leading end thereof, said at least one notch adapted to cooperate with a corresponding projection of said dielectric body to position said leading end in said dielectric body.

18. The pivotal connector assembly of claim 7 wherein said arcuate section of said rigidly mounted contact includes at least one notch at a leading end thereof, said at least one notch adapted to cooperate with a corresponding projection of said dielectric body to position said leading end in said dielectric body.

* * * * *